US006912671B2

(12) United States Patent
Christensen et al.

(10) Patent No.: US 6,912,671 B2
(45) Date of Patent: Jun. 28, 2005

(54) WIRING FAULT DETECTION, DIAGNOSIS AND REPORTING FOR PROCESS CONTROL SYSTEMS

(75) Inventors: Daniel D Christensen, Austin, TX (US); Steven D. Bonwell, Austin, TX (US); Michael L. Marshall, Georgetown, TX (US)

(73) Assignee: Bisher-Rosemount Systems, Inc, Austin, TX (US)

( * ) Notice: Subject to any disclaimer, the term of this patent is extended or adjusted under 35 U.S.C. 154(b) by 436 days.

(21) Appl. No.: 09/850,300

(22) Filed: May 7, 2001

(65) Prior Publication Data

US 2002/0194547 A1 Dec. 19, 2002

(51) Int. Cl.[7] .......................... G06F 11/00; G01R 31/28
(52) U.S. Cl. ....................................... 714/25; 714/721
(58) Field of Search ............................. 714/25, 26, 27, 714/32, 37, 43, 47, 48, 721, 742, 33, 44; 324/513, 539; 702/109, 122

(56) References Cited

U.S. PATENT DOCUMENTS

| 6,107,807 A | 8/2000 | Fluhrer ........................ 324/533 |
| 6,115,831 A | 9/2000 | Hanf et al. .................... 714/43 |

FOREIGN PATENT DOCUMENTS

| DE | 198 13 964 A1 | 8/1999 |
| DE | 101 04 908 A1 | 8/2002 |
| EP | 556 991 A1 | 8/1993 |

OTHER PUBLICATIONS

Horner, "Bus Interface Unit for use with Interbus–S and GE Fanuc Field Control", User Manual for HE670IBU100, May 7, 2002, 4 pages.

Siemens, "Quadlog The Safety PLC", Critical Discrete Module (CDM), pp. 1–5.

U.K. Search Report issued in GB 0210353.9 dated Nov. 11, 2002.

Examination Report under Section 18(3) issued in GB 0210353.9 application by the United Kingdom Patent Office on May 20, 2004.

"Fieldbus Supplement to Installing Your DeltaV Scalable Process System," Fisher–Rosemount Systems, Inc., Jul. 1999.

*Primary Examiner*—Nadeem Iqbal
(74) *Attorney, Agent, or Firm*—Marshall, Gerstein & Borun LLP (57) ABSTRACT

A wiring fault detection, diagnostic and reporting technique enables linking devices within a process control system to measure the electrical characteristics of a segment protocol bus and the electrical characteristics of the signals transmitted via the protocol bus. The technique connects a signal line of a segment protocol bus to one of a plurality of measurement blocks within a wiring fault detection unit. The one of the plurality of measurement blocks measures an electrical characteristic associated with the segment protocol bus and sends the measured electrical characteristic to a wiring fault diagnostic manager. The wiring fault diagnostic manager analyzes the measured electrical characteristic to determine a type of the wiring fault and reports the type of the wiring fault via a user interface.

28 Claims, 7 Drawing Sheets

WIRING FAULT DETECTION, DIAGNOSIS AND REPORTING FOR PROCESS CONTROL SYSTEMS

FIELD OF THE INVENTION

The present invention relates generally to process control systems and, more specifically, to automatically detecting, diagnosing and reporting wiring faults within communication segments of a process control system.

DESCRIPTION OF THE RELATED ART

Modern process control systems are typically microprocessor-based distributed control systems (DCSs). A traditional DCS configuration includes one or more user interface devices, such as workstations, connected by a databus (e.g., Ethernet) to one or more controllers. The controllers are generally located physically close to a controlled process and are connected to numerous electronic monitoring devices and field devices such as electronic sensors, transmitters, current-to-pressure transducers, valve positioners, etc. that are located throughout the process.

In a traditional DCS, control tasks are distributed by providing a control algorithm within each of the controllers. The controllers independently execute the control algorithms to control the field devices coupled to the controllers. This decentralization of control tasks provides greater overall system flexibility. For example, if a user desires to add a new process or part of a process to the DCS, the user can add an additional controller (having an appropriate control algorithm) connected to appropriate sensors, actuators, etc. Alternatively, if the user desires to modify an existing process, new control parameters or control algorithms may, for example, be downloaded from a user interface to an appropriate controller via the databus.

To provide for improved modularity and inter-manufacturer compatibility, process controls manufacturers have more recently moved toward even further decentralization of control within a process. These more recent approaches are based on smart field devices that communicate using an open protocol such as the HART®, PROFIBUS®, WORLDFIP®, Device-Net®, CAN, and Fieldbus protocols. These smart field devices are essentially microprocessor-based devices such as sensors, actuators, etc. that, in some cases, such as with Fieldbus devices, also perform some control loop functions traditionally executed by a DCS controller. Because some smart field devices provide control capability and communicate using an open protocol, field devices from a variety of manufacturers can communicate with one another on a common digital databus and can interoperate to execute a control loop without the intervention of a traditional DCS controller.

As is well known, smart field devices such as, for example, Fieldbus devices, may include one or more logical function blocks that perform control functions or portions of a control function. These function blocks may, for example, perform analog input functions, analog output functions, proportional-integral-derivative (PID) control functions, or any other desired control functions. As discussed in greater detail below, the function blocks within a smart field device may be communicatively linked with other function blocks within that smart field device or with function blocks within other smart field devices to carry out any desired control function. For example, an analog input block may be used to monitor a fluid flow via a flow sensor and a PID block may process a fluid flow value provided by the analog input block to provide responsive signals via an analog output block to an actuator that modulates the position of a valve plug. Thus, these function blocks may be communicatively linked to one another to form a PID-based control loop that controls the flow of a fluid through a valve.

Smart field devices typically communicate using an open protocol that is different from the protocol used by the controllers within a process control system. As a result, an interface device such as an input/output (I/O) device or linking device is typically used to provide a communication gateway between each segment (i.e., each interconnected group of smart field devices) and a controller. These linking devices enable the smart field devices within a segment to interoperate via a protocol data bus (e.g., a Fieldbus databus) with the function blocks of a controller and with smart field devices connected to other segments of the process control system. Thus, these linking devices enable a seamless integration of smart field devices within a distributed process control system because they enable the linking of field device information, such as function block information resident in one or more of the field devices, with function block information resident in the controller or other field devices and controllers distributed throughout the process control system.

While the protocol bus wiring for the multitude of segments that are typically used within a distributed process control system is being installed, one or more bus wires may be inadvertently connected to the wrong terminal (i.e., the wrong signal port, power supply voltage, etc.), one or more bus wires may be left unconnected (i.e., an open-circuit condition), and/or one or more bus wires may be improperly terminated. Additionally, even if all protocol bus wiring is initially installed properly, one or more of the bus wires may become severed or shorted to another wire or potential (e.g., a voltage source, ground line, etc.) during subsequent operation of the process control system.

Detecting, diagnosing and reporting a wiring fault within a segment is typically very difficult because current linking devices cannot measure or analyze the electrical characteristics such as the resistance, capacitance, etc. of the segment protocol bus or the amplitude, frequency, noise level, etc. of the signals being transmitted via the segment protocol bus. As a result, users at the system level (e.g., at an operator's terminal having a graphical user interface) cannot easily identify a wiring fault on a particular segment and are typically only informed by the system that the overall process is not operating properly and/or that a communication error has occurred. For example, in the case where two or more protocol bus wires within a segment become shorted to one another (or to another common potential), the controller may report to the user via a user interface that the smart field devices on that segment are not responding. However, the controller typically does not provide the user with any additional information that could be used to determine why the devices failed to respond. In fact, neither the controller nor the linking device can measure the resistance of the bus wires to detect the shorted condition, thereby preventing the detection and reporting of such a wiring fault.

With existing process control systems, the diagnosis of a segment protocol bus wiring fault is typically accomplished by dispatching a field technician to visually inspect each suspect segment. Additionally, the field technician typically uses a variety of test equipment such as an ohmmeter, a voltmeter, an oscilloscope, a signal generator, a capacitance meter, etc., to measure and compare the electrical characteristics of the segment protocol bus to expected ranges or levels and to assess the qualities such as, for example, the noise level, amplitude, frequency, etc. of the communication and power supply signals transmitted via the bus wires. The measured electrical characteristics of the segment protocol bus and the measured electrical characteristics of the signals transmitted via the bus wires may be used by the field technician to diagnose the specific nature or type of a wiring fault (e.g., a short circuit, an open circuit, an improper termination, etc.), thereby enabling the field technician to take appropriate corrective action. Thus, with existing systems, a field technician typically does not have any information, other than that a communication problem exists, indicating on which segment the wiring fault has occurred or what type of wiring fault is likely to have caused the communication problem. As a result, the field technician must carry a relatively large amount of equipment to the location of each suspect (or possibly every) segment bus to guarantee that a proper diagnosis can be made at the segment location.

SUMMARY OF THE INVENTION

A wiring fault detection, diagnostic and reporting technique enables linking devices (i.e., the interfaces between smart field devices and controllers) within a process control system to measure the electrical characteristics of a segment protocol bus and the signals transmitted via the protocol bus. The technique described herein also enables the linking devices to analyze the measured electrical characteristics to determine whether a wiring fault exists on a protocol bus connected to that linking device. Additionally, the technique described herein enables the linking devices to report the wiring fault information such as electrical characteristic information, signal quality information, diagnostic information, etc. to respective controllers which, in turn, may automatically report this wiring fault information to a user via a user interface. In this manner, the wiring fault detection, diagnostic and reporting technique described herein enables a user to perform commissioning activities such as, for example, wiring check outs, in an efficient and convenient manner from an operator's terminal, thereby reducing or eliminating the need for a field technician to physically inspect every segment throughout the process control system, as is required with current systems.

In accordance with one aspect of the invention, a system and method for use within a process control system having a user interface, a controller, and a protocol bus, includes a wiring fault detection unit having a plurality of measurement blocks and a signal switching unit, and a wiring fault diagnostic manager. The system and method may connect a signal line of the protocol bus to one of the plurality of measurement blocks. Additionally, the system and method may measure an electrical characteristic associated with the protocol bus using the one of the plurality of measurement blocks and may send the measured electrical characteristic to the wiring fault diagnostic manager. Still further, the system and method may determine a type of the wiring fault based on the measured electrical characteristic and may automatically report the type of the wiring fault to the user interface.

In accordance with another aspect of the invention, a system for detecting a wiring fault for use within a process control system having a user interface, a controller, a protocol bus, and a processor, includes a wiring fault detection unit. The wiring fault detection unit may include a plurality of measurement blocks and a signal switching unit. The system may further include a computer readable medium and a first routine stored on the computer readable medium and adapted to be executed by the processor that causes the wiring fault detection unit to connect a signal line of the protocol bus to one of the plurality of measurement blocks. The system may further include a second routine stored on the computer readable medium and adapted to be executed by the processor that causes the wiring fault detection unit to measure an electrical characteristic associated with the protocol bus using the one of the plurality of measurement blocks. Still further, the system may include a third routine stored on the computer readable medium and adapted to be executed by the processor that determines a type of the wiring fault based on the measured electrical characteristic. Additionally, the system may include a fourth routine stored on the computer readable medium and adapted to be executed by the processor that automatically reports the type of the wiring fault to the user interface.

DESCRIPTION OF THE PREFERRED EMBODIMENTS

While a technique for detecting, diagnosing and reporting wiring faults within a distributed process control system is described in detail in conjunction with a process control system that implements process control functions using Fieldbus devices, the wiring fault detection, diagnosis and reporting technique described herein may be used with process control systems that perform control functions using other types of field devices and communication protocols, including protocols that rely on other than two-wire buses and protocols that support only analog or both analog and digital communications, such as those mentioned previously.

The Fieldbus protocol is an all-digital, serial, two-way communication protocol that provides a standardized physical interface to a two-wire loop or bus interconnecting field equipment such as sensors, actuators, controllers, valves, etc. located in an instrumentation or process control environment of, for example, a factory or a plant. The Fieldbus protocol provides, in effect, a local area network for field devices within a process, which enables these field devices to interoperate to perform control functions at locations distributed throughout a process and to communicate with one another before and after the performance of these control functions to implement an overall control strategy. Although the Fieldbus protocol is a relatively new all-digital communication protocol developed for use in process control systems, the Fieldbus protocol is known in the art and is described in detail in numerous articles, brochures and specifications published, distributed, and available from, among others, the Fieldbus Foundation, a not-for-profit organization headquartered in Austin, Tex.

Figure 1:
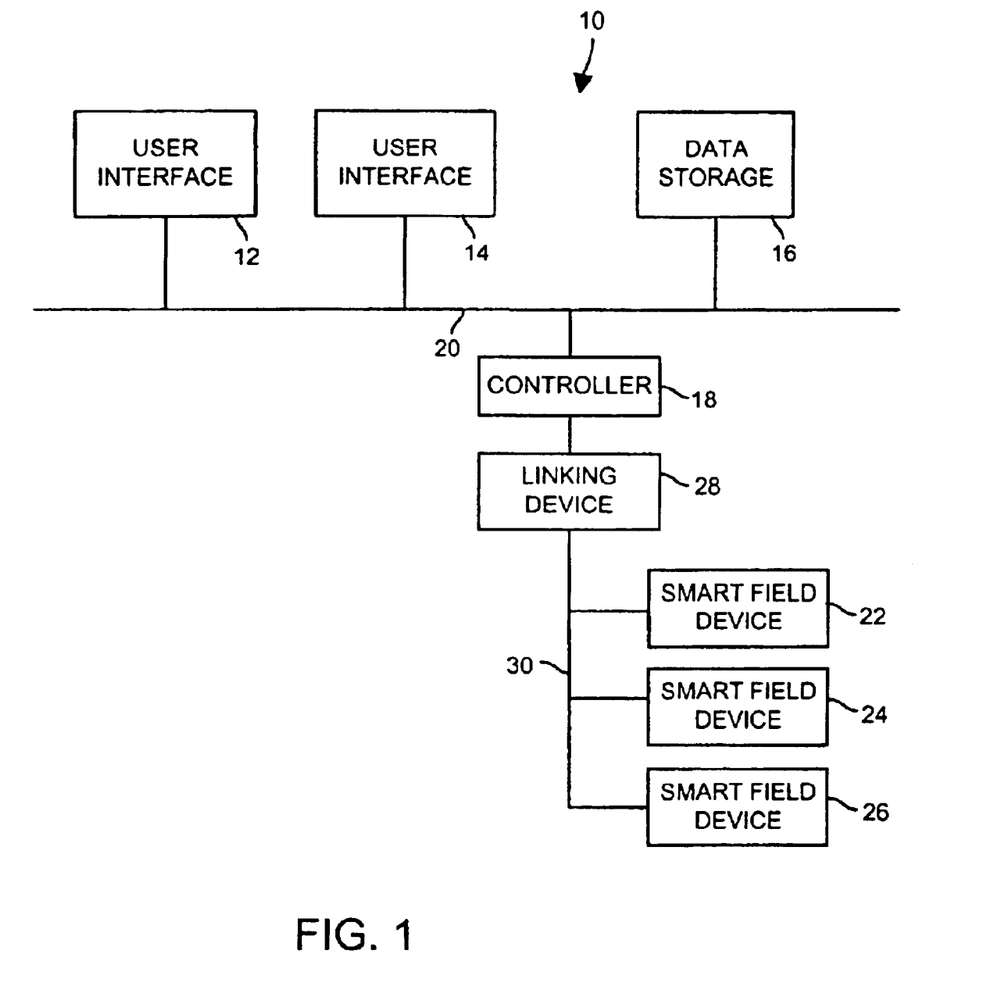
FIG. 1 is a schematic block diagram of an exemplary process control system having a linking device that detects, diagnoses and reports segment protocol bus wiring faults.

FIG. 1 illustrates an exemplary process control system 10 that uses, for example, Fieldbus field devices. The process control system 10 includes user interfaces 12 and 14, which may be, for example, workstations connected in a communication network to a number of other devices such as a data storage device 16 and a controller 18 via a system level databus 20. The system level databus 20 may be an Ethernet databus or any other databus suitable for the transmission of data.

The controller 18 may be a DCS controller and may communicate with the user interfaces 12 and 14 using a proprietary communication protocol, or in any other suitable manner, via the system level databus 20. For example, the controller 18 may send alarm, status and diagnostic information to the user interfaces 12 and 14 and may additionally receive user commands/requests from the user interfaces 12 and 14 via the system level databus 20. The controller 18 may further include control algorithms for use in controlling field devices that are connected to the controller 18 in any conventional or any other desired manner.

In particular, the controller 18 is in communication with smart field devices 22–26 via a linking device 28. The field devices 22–26 are connected in a communication network via a non-proprietary protocol databus 30 and communicate with one another and the linking device 28 to execute one or more process control loops either in conjunction with or independently from the controller 18. The smart field devices 22–26 may be, for example, Fieldbus devices, in which case the non-proprietary protocol databus 30 employs the Fieldbus signal protocol. However, other types of devices and protocols could be used as well.

While the smart field devices 22–26 are illustrated in FIG. 1 as being connected to the non-proprietary protocol databus 30 in a standard bus-type configuration, in which multiple devices are connected to the same pair of wires, the Fieldbus protocol allows other device/wire topologies including point-to-point connections, in which each device is connected to a controller or a host via a separate two-wire pair (similar to typical 4–20 mA analog DCS systems), and tree or "spur" connections in which each device is connected to a common point in a two-wire bus that may be, for example, a junction box or a termination area in one of the field devices within a process control system.

Each of the smart field devices 22–26 is capable of communicating over the non-proprietary protocol databus 30 and is capable of independently performing one or more process control functions using data acquired by the field device from the process or from a different field device via communication signals on the bus 30. In particular, Fieldbus devices are capable of directly implementing portions of an overall control strategy that, in the past, were performed entirely within a DCS controller.

To implement any control strategy using function blocks distributed throughout a process control system, the execution of the function blocks must be precisely scheduled with respect to the execution of other function blocks in a particular control loop. Likewise, communication between different function blocks must be precisely scheduled on the bus 30 so that the proper data is provided to each function block before that block executes.

For communication to occur on the bus 30, the link active scheduler (LAS), which can be the linking device 28 or any other smart field device having link master capability (e.g., one of the field devices 22–26), must actively schedule and control communications on the protocol bus 30. The LAS stores and updates a communication schedule (i.e., a link active schedule) containing the times that each function block of each device is scheduled to start periodic (i.e., synchronous) communication activity on the bus 30 and the length of time for which this communication activity is to occur. While there may be one and only one active LAS device on the bus 30, other smart field devices having link master device capability (such as the device 22) may serve as backup LASs and become active when, for example, the current LAS fails.

Generally speaking, communication activities over the bus 30 are divided into repeating macrocycles, each of which includes one synchronous communication for each function block (having external links) active on the bus 30 and one or more asynchronous communications for one or more of the function blocks or devices active on the bus 30. To conserve bandwidth on the bus 30, communications between two function blocks within a single device need not be published on the bus 30 and may be accomplished using communication links that are completely internal to the device.

Generally speaking, the linking device 28 provides a communication gateway or bridge between the smart field devices 22–26 that communicate using a non-proprietary protocol and a controller 18 that may not be using the non-proprietary protocol. More specifically, the linking device 28 monitors all the communications on the smart field device protocol bus 30 and processes the monitored communications so that function block information subscribed to by the controller 18 may be conveyed to the controller 18 as needed, identification information (e.g., addresses, tags, etc.) associated with a field device may be conveyed to a user terminal, and communication diagnostic information (such as timing and linking problems) associated with the field device protocol bus 30 can be generated by detecting a deviation between the actual communications on the bus 30 and the scheduled communications in accordance with a link active schedule that is stored in the linking device 28.

Figure 2:
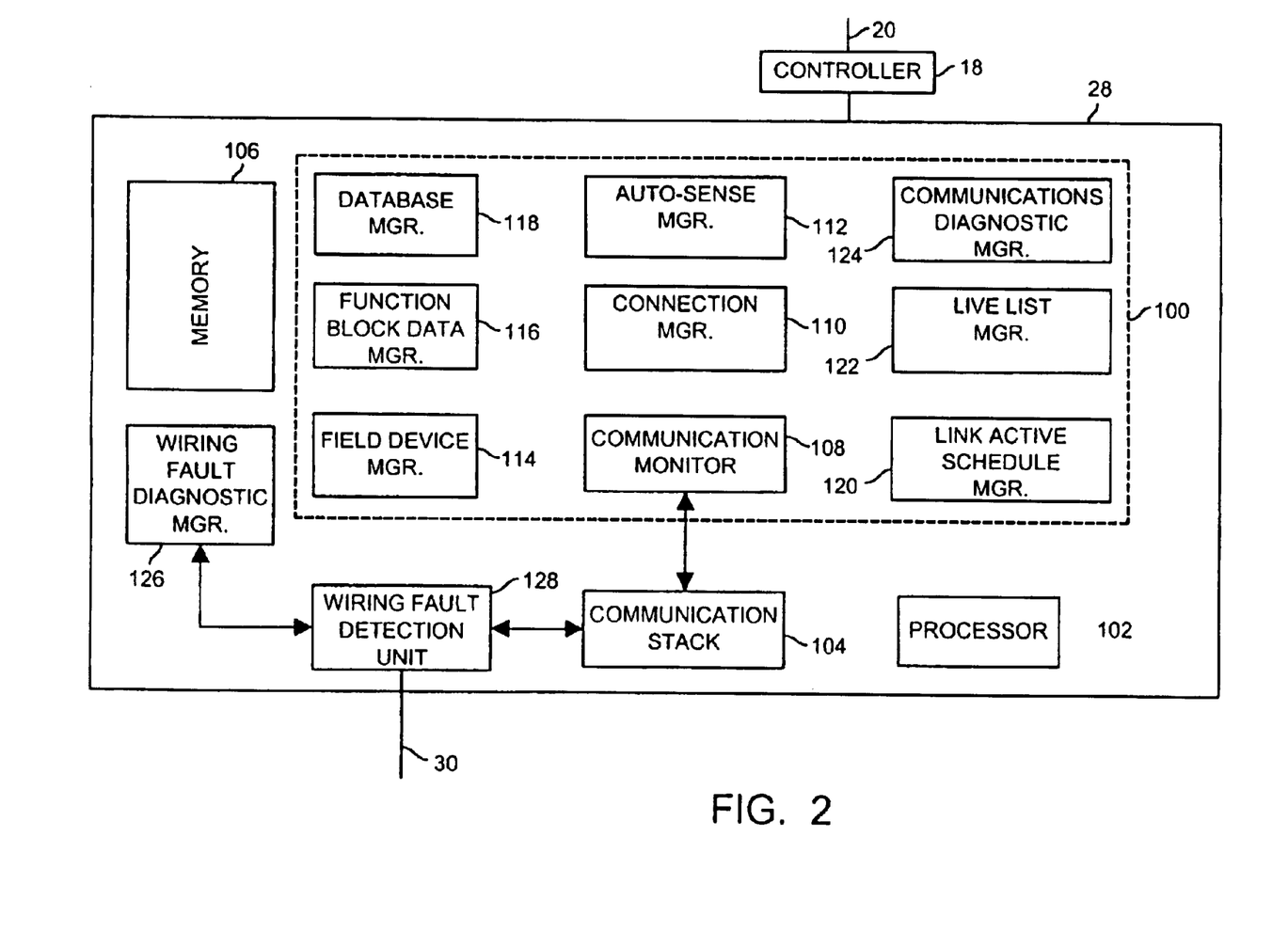
FIG. 2 is a more detailed exemplary block diagram of the linking device shown in FIG. 1.

FIG. 2 is a more detailed exemplary block diagram of the linking device 28 shown in FIG. 1. The linking device 28 allows an integration of the field devices 22–26 (FIG. 1) with the process control system 10 (FIG. 1). For instance, in addition to providing conventional communication links between the function block parameters of the smart field devices 22–26 on the non-proprietary protocol bus 30, the linking device 28 also enables communication links between function blocks of the field devices 22–26 and function blocks that reside within the controller 18. Thus, the linking device 28 allows a user to define control loops using combinations of function blocks that reside in the controller 18 and in one or more of the field devices 22–26.

As noted above, the linking device 28 provides diagnostic capabilities for facilitating the troubleshooting of communication problems on the field device protocol bus 30. The linking device 28 monitors and analyzes substantially all of the communications on the protocol bus 30 and uses the link active schedule as a communication template to identify communication and linking problems, such as where a field device fails to provide fresh data at the correct time to the correct recipient, or fails to provide any data. Because the linking device 28 can communicate freely with the controller 18, the diagnostic information can be easily conveyed to the user at the system level (i.e., a user interface), which eliminates the need for the user to locally monitor and manually determine field device communication problems.

The linking device 28 automatically subscribes to all communications on the protocol bus 30 using, for example, the link active schedule. Because the link active schedule contains a communication template for the protocol bus 30, the linking device 28 can determine the precise times at which particular field devices are scheduled to communicate on the bus 30. Thus, by comparing the link active schedule to the actual communications on the bus 30, deviations from the link active schedule can be identified as possible communication problems with particular field devices. These deviations from the link active schedule can be used by the linking device 28 to generate communication diagnostic information associated with the smart field devices 22–26 that may be useful in troubleshooting and/or configuring the process control system 10 (FIG. 1). For example, the diagnostic information may include linking problems such as a failure of a device to transmit data properly to a subscribing device and/or may include timing problems that may be identified using statistical information such as, for example, the number of times a device has failed to provide fresh data to a subscribing device. Of course, a wide variety of other communication-related diagnostic information can be generated by making appropriate comparisons and analyses of the actual and scheduled communication activities.

The linking device 28 also provides wiring fault detection, diagnostic and reporting capabilities. As will be described in greater detail below, the linking device 28 can measure the electrical characteristics such as, for example, the resistance, capacitance, etc. of the protocol bus 30 and can also measure the electrical characteristics of the signals being transmitted via the bus 30, such as, for example, the amplitude, frequency, noise level, etc. of the signals. The linking device 28 may further process or analyze these measured electrical characteristics to determine whether a wiring fault exists on the bus 30 and may diagnose the specific nature of a wiring fault. For example, the linking device 28 may measure one or more resistances associated with one or more bus wires or signal lines of the bus 30 and, based on a comparison of the measured resistances to predetermined resistance values or ranges of resistance values, determine that a wiring fault exists on one or more of the bus wires (e.g., a short circuit, an open circuit, an improper termination, etc.). The linking device 28 may then convey or report the detected wiring fault information, which may include wiring fault diagnostic information, to the controller 18 which, in turn, may report this information to the user via one or more of the user interfaces 12 and 14.

As shown in FIG. 2, the linking device 28 includes a plurality of functional blocks 100 which are controlled by a processor 102 to publish and subscribe to communications on the protocol bus 30 via a communications stack 104 and to enable detection, diagnosis and automatic system-level reporting of wiring faults on the protocol bus 30. The functional blocks 100 may be implemented using any desired combination of hardware and software. Generally, the functional blocks 100 may be efficiently implemented using the processor 102 to execute a number of software code segments or modules that are retrieved from a local computer readable memory 106. However, other combinations of hardware and software using, for example, algorithm specific integrated circuits (i.e., ASICs) or other types of hardware may be used to accomplish the same functions without departing from the scope and the spirit of the invention.

The functional blocks 100 within the linking device 28 include, but are not limited to, a communication monitor 108, a connection manager 110, an auto-sense manager 112, a field device manager 114, a function block data manager 116, a database manager 118, a link active schedule manager 120, a live list manager 122, a communications diagnostic manager 124, and a wiring fault diagnostic manager 126. The linking device 28 also includes a wiring fault detection unit 128 which, as described in greater detail below, includes functional blocks that can measure the electrical characteristics of the bus 30 and the electrical characteristics of the signals being transmitted on the bus 30. As shown in FIG. 2, the wiring fault detection unit 128 is communicatively coupled to the wiring fault diagnostic manager 126 and provides electrical characteristic information to the wiring fault diagnostic manager 126 for further processing and reporting to a user at the system level.

A general outline of the operations of the above-noted functional blocks 100 will be provided below and will be followed with a more detailed discussion of how the various functional blocks cooperate to provide communication troubleshooting capabilities that enable a system user to remotely troubleshoot a segment protocol bus from, for example, a user interface.

The communication stack 104 is a conventional Fieldbus communication stack, which allows the functional blocks 100 to communicate (i.e., receive and send) information along the protocol bus 30 to the field devices 22–26 (FIG. 1). The communication monitor 108 monitors all communications on the bus 30 and routes the information to one or more of the other functional blocks 110-124 for further processing.

The connection manager 110 uses the communication stack 104 to coordinate communications on the protocol bus 30. For instance, the connection manager 110 may use the link active schedule, a copy of which is stored in the memory 106, to send/receive information from the field devices 22–26 during either asynchronous or synchronous communication intervals of a macrocycle on the bus 30. Some of the information transmitted synchronously may include function block information needed by or sent by function blocks within the controller 18. In this manner, the connection manager 110 allows the linking device 28 to emulate the synchronous communication characteristics of a field device.

The field device manager 114 controls the downloading of configuration information to the Fieldbus devices 22–26. For example, virtual communication relationships (VCRs), addresses, tags, etc. may be sent by a user via the user interfaces 12 and 14, the controller 18, and the linking device 28 to one or more of the field devices 22–26.

The link active schedule manager 120 controls the loading of the link active schedule in any other link active schedulers that may be present on the protocol bus 30. The database manager 118 stores Fieldbus information for reporting to the controller 18. The Fieldbus information stored in the database manager 118 may include view list information, data subscribed to by the controller 18 (i.e., function block information), statistical information relating to the communications on the bus 30, etc. The communications diagnostic manager 124 detects communication problems (e.g., timing problems) on the protocol bus 30 and reports the problems to the user via one of the user interfaces 12 and 14, the controller 18 and the system level network 20.

The auto-sense manager 112, the live list manager 122 and the communications diagnostic manager 124 work together to automatically analyze/detect and report to the user communication problems associated with communications on the protocol bus 30, thereby enabling the user to engage in communication troubleshooting from the system level (e.g., the user interface 12 and 14). The auto-sense manager 112 uses the link active schedule and the live list to identify and to communicate with the field devices 22–26, via the connection manager 110 and the communication stack 108. The live list manager 122 detects when field devices are added to or are no longer communicating on the protocol bus 30 and reports changes to the auto-sense manager 112 and the communications diagnostic manager 124. The auto-sense manager 112 may collect and produce identification information such as addresses, tags, serial numbers, functional roles (e.g., whether the field device is a basic device or a bridge device), etc. that are associated with one or more of the field devices 22–26 and compare the identification information to commissioning (i.e., configuration) information stored in the database manager 118 and/or the memory 106. Based on the comparison, the auto-sense manager 112 determines if there is a discrepancy, such as, for example, if a device has been added to or removed from the protocol bus 30. To further improve the diagnostic capabilities of the linking device 28, the auto-sense manager 112 may be adapted to automatically report any discrepancy to the user.

The wiring fault diagnostic manager 126 receives signals indicative of measured electrical characteristics associated with the signal lines or wires of the bus 30 from the wiring fault detection unit 128 and further processes these signals to determine whether there are any wiring faults on the bus 30. In particular, the wiring fault diagnostic manager 126 may determine that a wiring fault exists on a particular segment protocol bus within the system 10 (such as the bus 30) and may further identify the specific nature or type of the wiring fault. For example, the wiring fault diagnostic manager 126 may determine that a particular one of the signal lines of the bus 30 is shorted, is an open circuit, is improperly terminated, is excessively noisy, etc. Any such wiring fault information generated by the wiring fault diagnostic manager 126 may be communicated to the controller 18 which, in turn, may report the wiring fault information to the user via one of the user interfaces 12 and 14. Thus, the wiring fault detection unit 128 and the wiring fault diagnostic manager 126 enable a system user at one of the interfaces 12 and 14 to identify a wiring fault within any segment protocol bus of the process control system 10, thereby eliminating the requirement for a field technician to physically inspect every communication segment during system check out or commissioning. The wiring fault diagnostic manager 126 also sends control signals and commands to the wiring fault detection unit 128 to control the operations of the wiring fault detection unit 128. For example, the wiring fault diagnostic manager 126 may send commands to the wiring fault detection unit 128 that cause the wiring fault detection unit 128 to carry out a particular electrical characteristic measurement or sequence of measurements at particular times.

Figure 3:
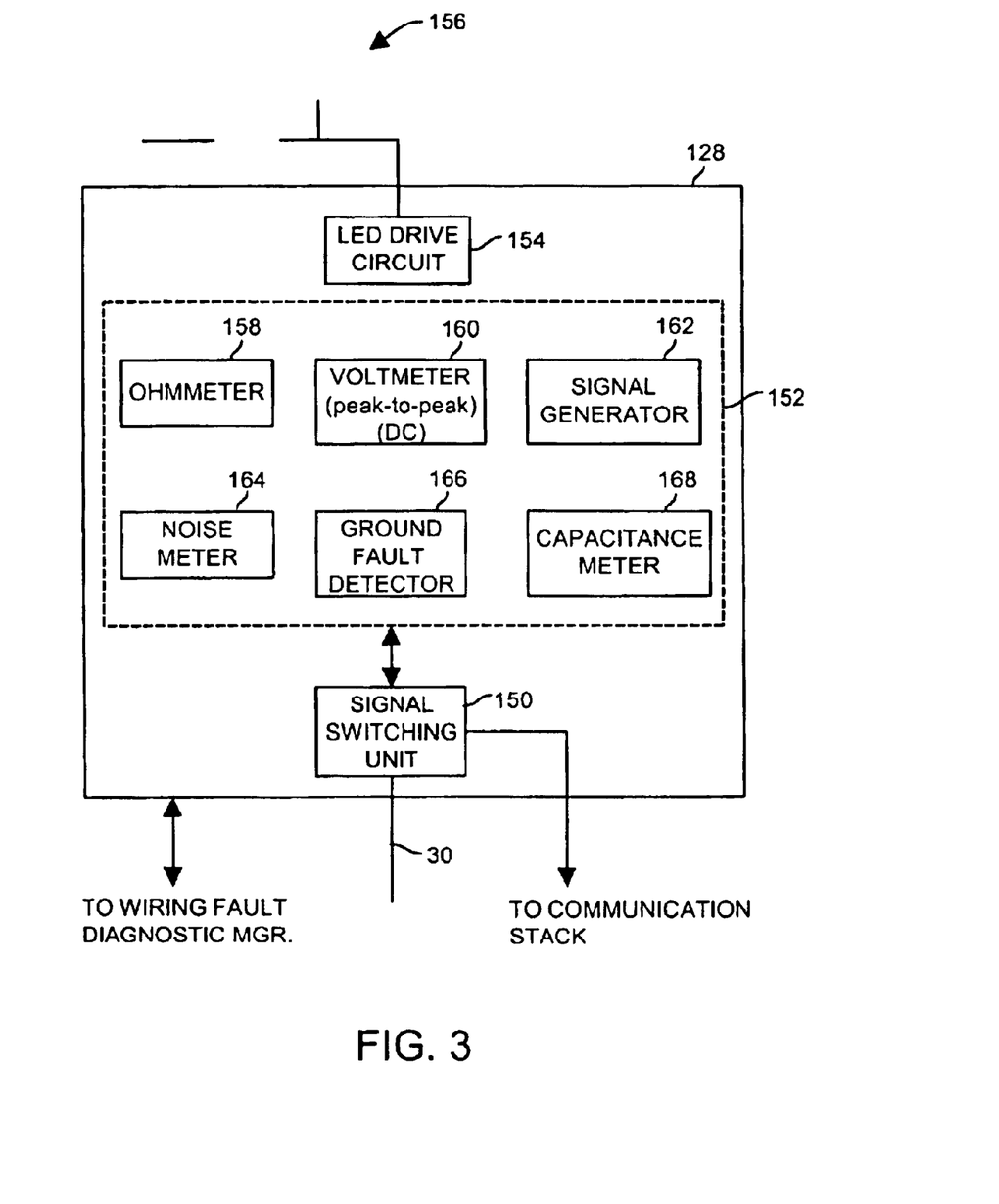
FIG. 3 is a more detailed exemplary block diagram of the wiring fault detection unit shown in FIG. 2.

FIG. 3 is a more detailed exemplary block diagram of the wiring fault detection unit 128 shown in FIG. 2. As shown in FIG. 3, the wiring fault detection unit 128 includes a signal switching unit 150, a plurality of measurement blocks 152, a light-emitting diode (LED) drive circuit 154 and a plurality of LEDs 156. By way of example only, the plurality of measurement blocks 152 includes an ohmmeter block 158, a voltmeter block 160, a signal generator block 162, a noise meter block 164, a ground fault detector block 166 and a capacitance meter block 168. Of course, any other blocks for measuring the electrical characteristics of the bus 30 or of the signals transmitted via the bus 30 may be included if desired.

The signal switching unit 150 includes signal switching circuitry that, in response to commands from the wiring fault diagnostic manager 126, connects one or more of the signal lines or wires of the bus 30 to one or more of the measurement blocks 158–168. Additionally, the signal switching unit 150 may connect the signal lines of the bus 30 to communication circuitry (i.e., the physical layer of the communication stack 104) within the linking device 28. The signal switching unit 150 may be implemented using electromechanical devices such as relays, reed switches, etc. and/or may use solid state devices such as discrete transistors, analog multiplexers, etc. Of course, any other suitable signal switching devices may be used instead without departing from the scope and the spirit of the invention.

The ohmmeter block 158 is preferably, but not necessarily, configured to measure resistances between zero ohms and at least twenty megaohms by sending a relatively small direct current (DC) through a selected pair of signal lines of the bus 30 and measuring a resultant voltage drop. However, due to the relatively small DC current used by this resistance measurement technique, the ohmmeter block 158 requires the signal switching unit 150 to disconnect the signal lines of the bus 30 from the communication circuitry within the linking device 28 while the ohmmeter block 158 carries out the resistance measurement.

The voltmeter block 160, on the other hand, is configured to measure peak-to-peak alternating current (AC) voltage, DC voltage, AC root mean squared (RMS) voltage, etc. while the signal lines of the bus 30 are connected to the communication circuitry of the linking device 28 and while Fieldbus communications are active on the bus 30. Connecting the voltmeter block 160 to the signal lines of the bus 30 in this manner does not have any practical effect on active communications because the voltmeter block 160 has a high input impedance (e.g., greater than one megaohm). In operation, the voltmeter block 160 may be used to measure any DC supply voltage on the bus 30, the signal amplitude or strength (using, for example, a peak-to-peak voltage measurement function) on the bus 30, or any other voltage that may be indicative of the quality of the signals transmitted via the bus 30.

The signal generator block 162 is configured to generate AC signals that may be transmitted via one or more signal lines of the bus 30 and measured by, for example, the voltmeter block 160 to determine the transmission characteristics of the bus signal lines. The signal generator block 162 may provide any variety of waveforms desired, such as, for example, square waves, sawtooth waveforms, sinusoidal waveforms, impulses, step function waveforms, frequency modulated waveforms, amplitude modulated waveforms, etc. Thus, the signal generator block 162 may be used to measure the response of the bus 30 to various types of communications or signals, thereby enabling these measurements to be used to diagnose a variety of wiring faults. For example, the signal generator 162 may output a fixed amplitude sinusoidal current waveform on one or more of the signal lines of the bus 30 and the resulting peak-to-peak voltage may be measured by the voltmeter block 160. The peak-to-peak voltage measured by the voltmeter block 160 may be indicative of the load on the bus 30 and, in a case where the peak-to-peak voltage is substantially near zero volts, it may be indicative of a short circuit on one or more bus lines. In general, use of the signal generator block 162 to transmit signals on the bus 30 requires the signal switching unit 150 to disconnect the communication circuitry of the linking device 28 from the bus 30.

The noise meter block 164 may be connected via the signal switching unit 150 to the bus 30 while Fieldbus communications are active on the bus 30 to measure noise levels present on one or more signal lines of the bus 30 within one or more frequency bands. The noise meter block 164 may use any conventional or any other suitable filtering techniques to selectively measure peak noise power, average noise power, etc. within a desired frequency band.

The ground fault detector block 166 may be connected via the signal switching unit 150 to the bus 30 when the signal lines of the bus 30 are disconnected from the communication circuitry of the communication stack 104 to determine whether the ground signal line or wire of the bus 30 is improperly connected to another potential. The ground fault detector block 166 detects an unusually low resistance (e.g., a short) between a bus signal line and system ground such as, for example, the unusually low resistance that would result from the ground signal line or wire of the bus 30 shorting to a shield line or to any other signal line or wire of the bus 30.

The capacitance meter block 168 may be connected via the signal switching unit 150 (when the signal lines of the bus 30 are disconnected from the communication circuitry of the linking device 28) to measure a capacitance between a pair of bus lines. The capacitance meter block 168 may be implemented using any conventional technique such as techniques that measure a charging rate (i.e., a time-based technique) or that measure an impedance, or any other technique.

In general, the measurement blocks 158–168 may be implemented using any suitable technique for measuring the electrical characteristics of signal lines and signals transmitted via signal lines. For example, the measurement blocks 158–168 may be implemented using digital signal processing techniques or analog signal processing techniques or, alternatively, any combination of analog and digital processing techniques without departing from the scope and the spirit of the invention.

Although the measurement blocks 158–168 are shown by way of example as separate functional blocks, one or more of the measurement functions carried out by the blocks 158–168 may be combined if desired. For example, the voltmeter block 160 and the noise meter block 164 may be implemented using a digital oscilloscope block that converts bus signals to digital values and processes these digital values to measure voltages and/or to measure noise using, for example, digital filtering techniques, spectral analysis techniques (e.g., fast Fourier transform based techniques), etc.

Additionally, while some of the measurement blocks 158–168 are described as being connected to the bus 30 while communications are inactive, thereby preventing these measurement blocks from interfering with communications, other methods of preventing interference may be used instead. For example, measurement blocks that could interfere with Fieldbus communications may be connected during asynchronous Fieldbus communication intervals, which enables the Fieldbus devices on the bus 30 to communicate in an unimpaired manner during scheduled synchronous intervals. Alternatively, these measurement blocks may be scheduled to perform measurement activities during particular synchronous intervals in a manner that does not interfere with other synchronous communications on the bus 30. In any event, it should be recognized that it is not necessarily required that the wires or lines of the bus 30 are disconnected from the communication stack 104 while resistance measurements, capacitance measurements, or any other measurements are being made.

The LED drive circuit 154 may receive signals or commands from one or more of the measurement blocks 152 and/or from the wiring fault diagnostic manager 126 to illuminate one or more of the LEDs 156. Each of the LEDs 156 may uniquely correspond to a particular type of wiring fault and/or may correspond to a particular signal line of the bus 30. For example, one of the LEDs 156 maybe illuminated when the ohmmeter block 158 detects a short circuit between the "+" and "−" signal lines of the bus 30, another one of the LEDs 156 may be illuminated when the wiring fault diagnostic manager 126 determines (using, for example, the capacitor meter block 168) that the "+" signal line is improperly terminated, still another one of the LEDs 156 may be illuminated when the wiring fault diagnostic manager 126 determines (using, for example, the voltmeter block 160) that the signal strength measured between the "+" and "−" signal lines is below a minimum predetermined threshold, etc. Of course, the LED drive circuit 154 and the LEDS 156 may be configured to illuminate in any manner desired to provide a local (i.e., at the segment location) visual indication that particular wiring faults exist, thereby enabling a field technician to quickly identify the location and nature of a segment protocol bus wiring fault.

Figure 4A:
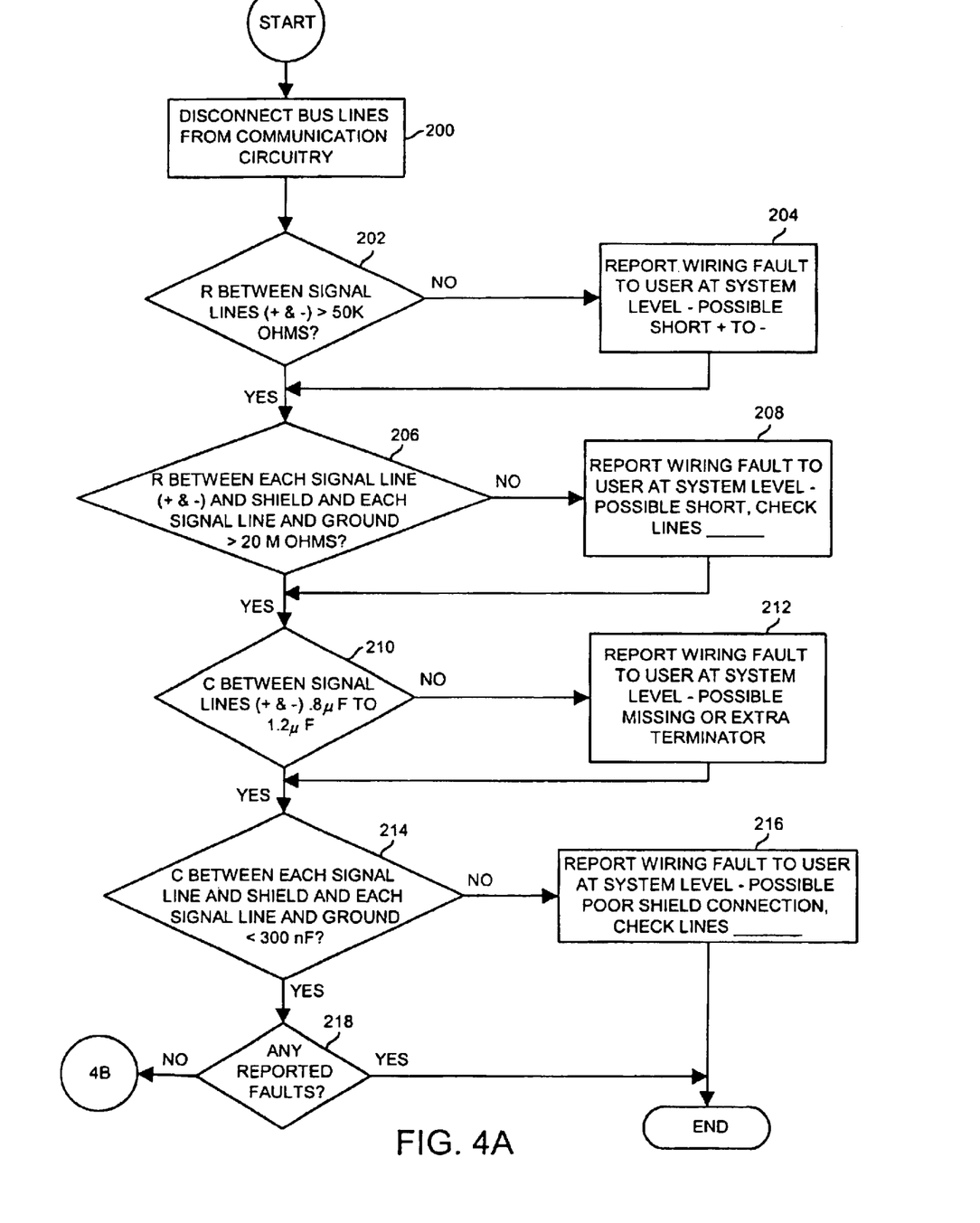
FIGS. 4A and 4B are exemplary flow diagrams depicting one manner in which the linking device shown in FIGS. 1 and 2 may be used to detect, diagnose and report segment protocol bus wiring faults.
Figure 4B:
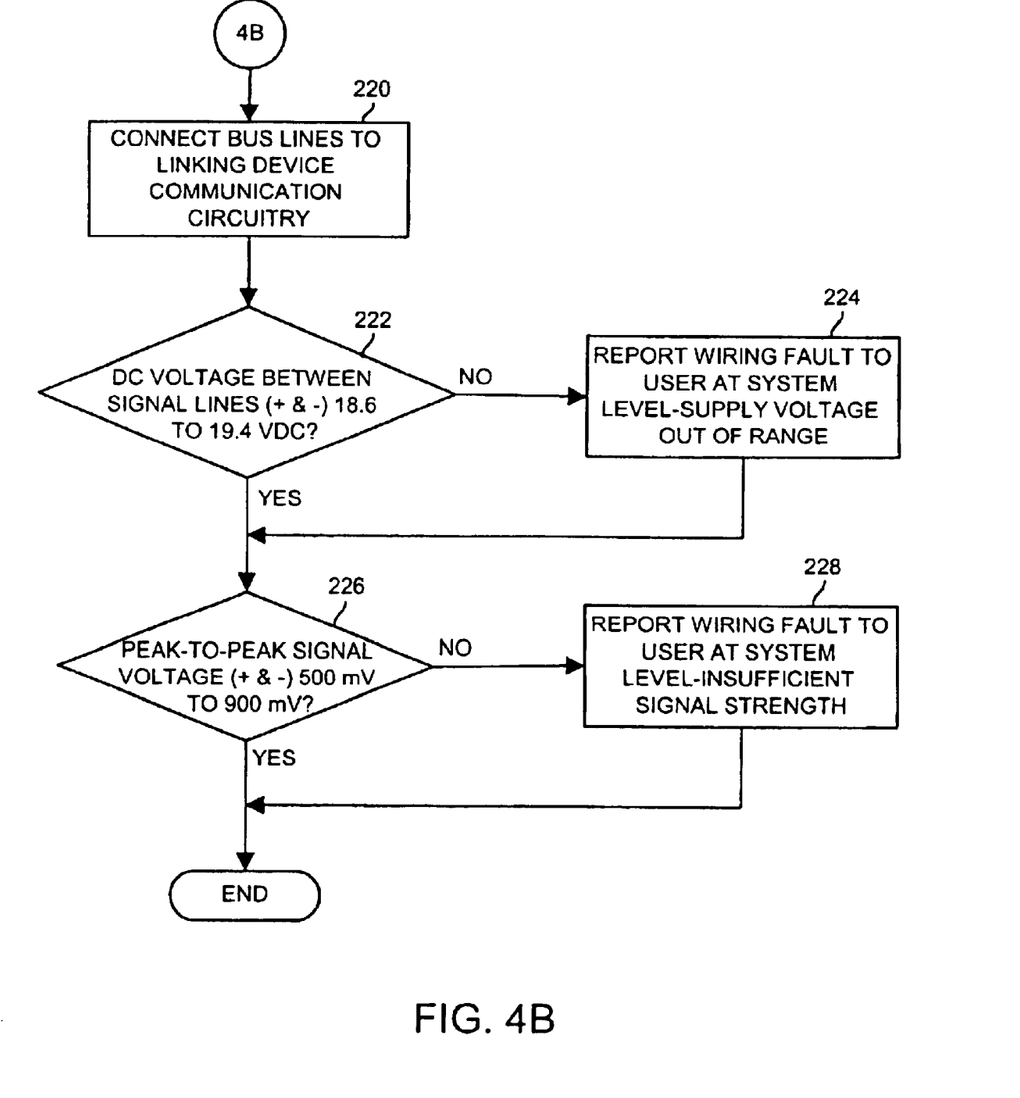

FIGS. 4A and 4B are exemplary flow diagrams depicting one manner in which the linking device 28 shown in FIGS. 1 and 2 may be used to detect, diagnose and report segment protocol bus wiring faults. Preferably, but not necessarily, the blocks shown in FIGS. 4A and 4B are carried out by the diagnostic manager 126 working in conjunction with the wiring fault detection unit 128. Alternatively, some of the blocks shown in FIGS. 4A and 4B may be carried out by the controller 18 and/or one or both of the user interfaces 12 and 14. Furthermore, while the wiring fault diagnostic manager 126 is depicted as residing entirely with the linking device 28, some or all of the functions of the wiring fault diagnostic manager 126 may instead reside within the controller 18, within one or both of the user interfaces 12 and 14, or within any other device within the process control system 10.

As shown in FIG. 4A, block 200 disconnects the signal lines of the segment protocol bus 30 from the communication circuitry (i.e., the physical layer of the communication stack 104) of the linking device 28. Block 202 uses the ohmmeter block 158 (FIG. 3) to measure the resistance between the "+" and "−" signals lines of the bus 30 and determines whether the measured resistance is greater than 50 kilohms (kohms). If the measured resistance is greater than 50 kohms, control passes to block 206. On the other hand, if the measured resistance is less than or equal to 50 kohms, control passes to block 204. Block 204 reports a wiring fault to the user at a system level and indicates that the "+" and "−" signals lines of a particular segment (e.g., the segment associated with the bus 30) may be shorted to each other and then passes control to block 206. To report the wiring fault to the user at the system level, the diagnostic manager 126 may convey the wiring fault information to the controller 18 which, in turn, may convey the wiring fault information to one or both of the user interfaces 12 and 14.

Block 206 measures the resistances between the each of the "+" and "−" signal lines and the shield line of the bus 30. Additionally, block 206 measures the resistances between the "+" and "−" signal lines and system ground potential (e.g., a system grounding bar). Block 206 then determines whether any of the measured resistances is greater than 20 megaohms (Mohms) and, if any of the resistances measured by block 206 is greater than 20 Mohms, control passes to block 210, otherwise, control passes to block 208. Block 208 reports a wiring fault to the user at the system level and indicates that a short circuit may exist between particular signals lines of a particular segment. If multiple faults, such as multiple shorts, are found, then block 208 reports all of the faults to the user at the system level. Block 208 then passes control to block 210.

Block 210 measures the capacitance between the "+" and "−" signal lines and compares the measured capacitance value to a predetermined range of capacitance values such as, for example, 0.8 microfarads ($\mu$F) to 1.2 $\mu$F. If the capacitance measured by block 210 falls outside of the predetermined range of capacitance values, control passes to block 212, otherwise, control passes directly to block 214. Block 212 reports a wiring fault to the user at the system level and indicates that a particular segment may not be properly terminated. Typically, a measured capacitance value of less than 0.5 $\mu$F indicates that there is no terminator coupled to the segment, whereas a measured capacitance value of 2 $\mu$F indicates that two terminators (i.e., an extra terminator) are coupled to the segment. Block 212 then passes control to block 214.

Block 214 measures the capacitance value between the "+" and "−" signal lines and the shield line and between the "+" and "−" signal lines and system ground. If any of the measured capacitance values are less than 300 nanofarads (nF), block 214 passes control to block 218, otherwise, block 214 passes control to block 216. Block 216 reports a wiring fault to the user at the system level and indicates that a poor shield connection may be present on those lines (within a particular segment) having excessive capacitances (i.e., greater than 300 nF). After block 216 reports wiring faults, the procedure terminates.

Block 218 determines if any of blocks 204–212 have reported a wiring fault, if a fault has been reported, the procedure terminates, otherwise, if no faults have been reported, then control passes to block 220. Block 220 reconnects the lines of the bus 30 to the communication circuitry (i.e., the physical layer within the communication stack 104) of the linking device 28. As a result of this connection, power is supplied to the field devices 22–26 and Fieldbus communications between the field devices 22–26 and the controller 18 may resume. Block 220 then passes control to block 222.

Block 222 measures the DC voltage between the "+" and "−" signal lines of the bus 30 and, if the measured DC voltage falls between 18.6 volts DC and 19.4 volts DC, control passes to block 226, otherwise, control passes to block 224. Block 224 reports a wiring fault to the user at the system level and indicates that the power supplied on the bus 30 is out of range. Block 224 then passes control to block 226.

Block 226 measures the peak-to-peak voltage between the "+" and "−" signal lines and, if the measured peak-to-peak voltage is between 500 millivolts (mV) and 900 mV, the procedure terminates. Otherwise, block 226 passes control to block 228. Block 228 reports a wiring fault to the user at the system level and indicates that the signal strength on the bus 30 is insufficient. As is known, an insufficient signal strength on a segment protocol bus may result from excessive bus length (i.e., wire lengths), too many devices being connected on the segment and/or one or more field devices having insufficient signal drive. Of course, an excessive number of terminators on a segment may also cause the signal strength to fall below 500 mV. However, the capacitance test described in connection with block 210 may be used to specifically identify an improperly terminated segment bus. After block 228 reports any wiring faults, the procedure terminates.

Figure 5:
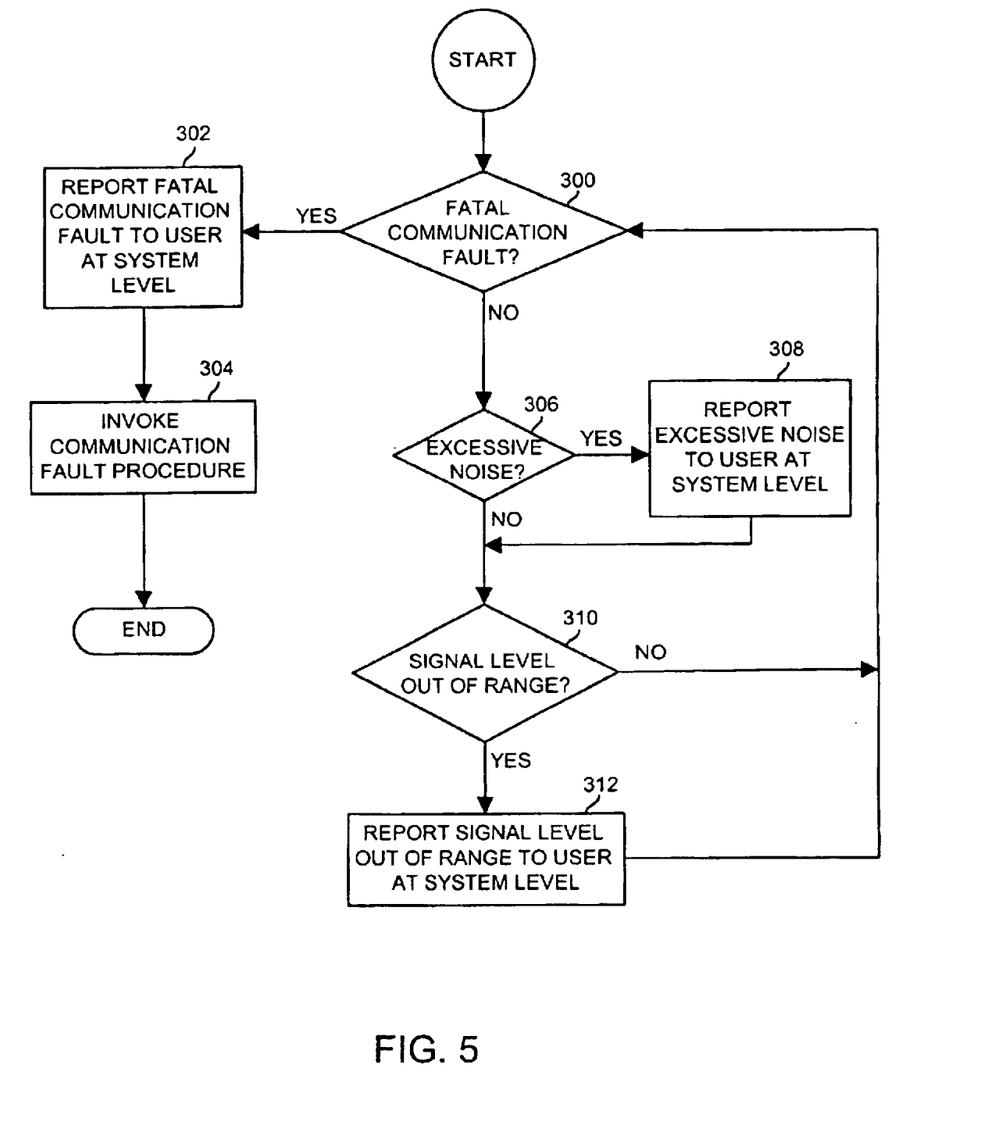
FIG. 5 is an exemplary flow diagram depicting another manner in which the linking device shown in FIGS. 1 and 2 may be used to detect, diagnose and report segment protocol bus wiring faults.

FIG. 5 is an exemplary flow diagram depicting another manner in which the linking device 28 shown in FIGS. 1 and 2 may be used to detect, diagnose and report segment protocol bus wiring faults. Block 300 determines if a fatal communication fault has occurred on the bus 30. Fatal communication faults include those faults which preclude the field devices on a segment protocol bus from interoperating properly. Fatal communication faults may be detected by comparing the actual communications (and the timing of the communications) to scheduled communications stored within the link active schedule. For example, if a device failed to communicate at a scheduled time according to the link active schedule, block 300 may determine that a fatal communication fault has occurred. If a fatal communication fault has occurred, control passes to block 302. Block 302 reports the fatal communication error to the user at the system level and block 302 then passes control to block 304. Block 304 invokes a communication fault diagnosis procedure. For example, block 304 may invoke the procedure depicted in FIGS. 4A and 4B, thereby enabling the system user to determine if the communication fault is a result of a wiring related problem.

If block 300 does not detect a fatal communication error, control passes to block 306. Block 306 measures the noise level on the bus 30 and compares the measured noise level to a predetermined threshold value. If the measured noise level is greater than the predetermined threshold level, control passes to block 308, otherwise, control passes to block 310. Block 308 reports to the user at the system level that excessive noise is present on the bus 30 and then passes control to block 310.

Block 310 measures the signal level (e.g., the peak-to-peak voltage) across the "+" and "−" signal lines of the bus 30 and compares the measured signal level to a predetermined range of values. If the measured signal level falls outside of the predetermined range of values, control passes to block 312, otherwise, control returns to block 300. Block 312 reports that the measured signal level is outside of the predetermined range to the user at the system level and then returns control to block 300.

The wiring fault detection, diagnosis and reporting technique described above by way of example in connection with FIGS. 4A and 4B may be used during commissioning of the system 10 (FIG. 1), thereby eliminating the requirement for a field technician to physically inspect the wiring of the bus 30 or the wiring of any other segment protocol bus within the system 10. In other words, the system 10 may be commissioned in an economical manner by a user stationed at one of the user interfaces 12 and 14. Further, the technique may be invoked periodically during operation of the system 10 either automatically and/or in response to a request by the system operator to perform system wiring integrity checks. Still further, the wiring fault detection, diagnosis and reporting technique described herein may be carried out automatically in response to a detected communication fault, as shown by way of example in FIG. 5.

If implemented in software, the functional blocks and process control routines discussed herein may be stored in any computer readable memory such as on a magnetic disk, a laser disk, or other storage medium, in a RAM or ROM of a computer, controller, field device, etc. Likewise, this software may be delivered to a user or a device via any known or desired delivery method including, for example, over a communication channel such as a telephone line, the Internet, etc.

Although the wiring fault detection, diagnosis and reporting technique is described herein as being integrated within one or more linking devices of a distributed process control system, the technique may be alternatively embodied within a portable device. Such a portable device may be implemented by incorporating the features and functions of the wiring fault diagnostic manager 126 and the wiring fault detection unit 128 into a portable unit that may be carried by a field technician, for example, and locally connected to a segment protocol bus to thereby determine whether a wiring fault exists on that segment protocol bus.

Figure 6:
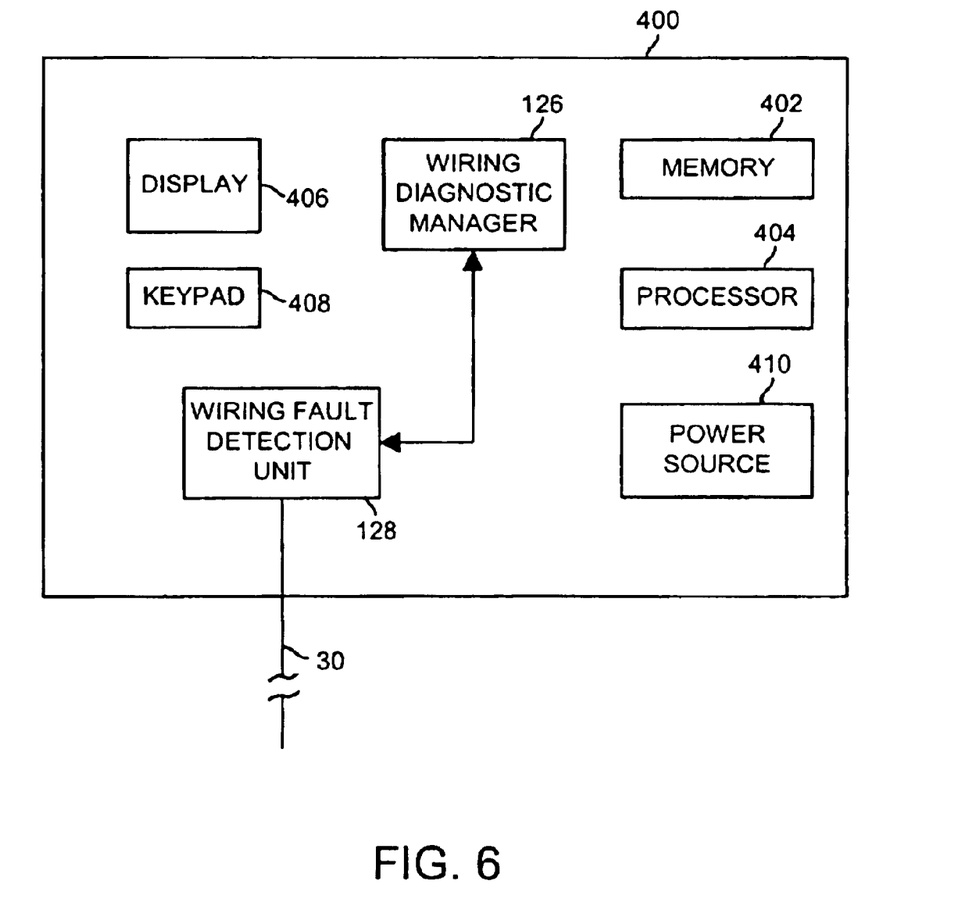
FIG. 6 is an exemplary schematic block diagram of a portable wiring fault detection and diagnosis device.

FIG. 6 is an exemplary schematic block diagram of a portable wiring fault detection and diagnosis device 400. As shown in FIG. 6, the portable wiring fault detection and diagnosis device 400 includes the wiring fault diagnostic manager 126 and the wiring fault detection unit 128, which are described in detail above in connection with FIGS. 2 and 3. The device 400 further includes a memory 402, a processor 404 that is communicatively coupled to the memory 404, a display 406, a keypad 408 and a power source 410.

The wiring diagnostic manager 126 and the wiring fault detection unit 128 function generally as described above except that wiring faults are not necessarily reported to a user interface at the system level. Instead, wiring fault information is displayed as graphic and/or textual information within the display 406. A user may request particular test sequences, may retrieve information stored in the memory 404, or may enter or change test parameters, etc. using the keypad 408. Preferably, but not necessarily, the power source 410 includes a battery so that the bus 30 may be tested without requiring a local power source near each segment that is to be tested. In operation, a field technician may connect the device 400 to a segment suspected of having a wiring fault, or any segment which needs to be commissioned, and invokes a desired test sequence.

While the invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A system that detects a wiring fault for use within a process control system having a plurality of smart field devices communicatively coupled to a protocol bus, the system comprising:

a linking device that enables a controller to communicate with the plurality of smart field devices, the linking device being further operable to automatically detect a communications problem associated with the protocol bus while the protocol bus is substantially active, and wherein the linking device has a wiring fault detection unit and a wiring fault detection unit residing therein;

the wiring fault detection unit being adapted to be coupled to the protocol bus to measure an electrical characteristic associated with the protocol bus while the protocol bus is substantially active; and the wiring fault diagnostic manager being communicatively coupled to the wiring fault detection unit and using the measured electrical characteristic to determine a type of the wiring fault.

2. The system of claim 1, wherein the wiring fault detection unit and the wiring fault diagnostic manager reside within a portable unit that is adapted to be locally coupled to the protocol bus.

3. The system of claim 2, wherein the portable unit includes:

a memory;

a processor communicatively coupled to the memory;

a display communicatively coupled to the processor that is adapted to display wiring fault information;

a keypad communicatively coupled to the processor; and a power source that supplies power to the portable unit.

4. The system of claim 1, wherein the wiring fault detection unit includes a signal switching unit and a plurality of measurement blocks coupled to the signal switching unit.

5. The system of claim 4, wherein the signal switching unit is adapted to be coupled to the protocol bus and to couple a signal line of the protocol bus to one of the plurality of measurement blocks.

6. The system of claim 5, wherein the signal switching unit is further adapted to disconnect the signal line of the protocol bus from a communication circuit.

7. The system of claim 4, wherein the signal switching unit is responsive to signals sent by the wiring fault diagnostic manager.

8. The system of claim 4, wherein the plurality of measurement blocks includes one of an ohmmeter block, a voltmeter block, a signal generator block, a noise meter block, a ground fault detector block, and a capacitance meter block.

9. The system of claim 1, wherein the type of the wiring fault is one of a short circuit, an open circuit, a ground fault, an improper termination, an insufficient signal strength, a poor quality ground connection and an improper supply voltage.

10. A method of detecting a wiring fault for use within a process control system having a user interface, a protocol bus, a linking device that enables a controller to communicate with the plurality of smart field devices, and wherein the linking device has a wiring fault detection unit and a wiring fault detection unit residing therein, the wiring fault detection unit including a plurality of measurement blocks and a signal switching unit, the method comprising:

automatically detecting a communications problem associated with the protocol bus while the protocol bus is substantially active;

connecting a signal line of the protocol bus to one of the plurality of measurement blocks;

measuring an electrical characteristic associated with the protocol bus using the one of the plurality of measurement blocks while the protocol bus is substantially active;

sending the measured electrical characteristic to the wiring fault diagnostic manager;

determining a type of the wiring fault based on the measured electrical characteristic; and automatically reporting the type of the wiring fault to the user interface.

11. The method of claim 10, wherein the step of connecting the signal line of the protocol bus to the one of the plurality of measurement blocks includes the step of connecting the signal line to one of an ohmmeter block, a voltmeter block, a signal generator block, a noise meter block, a ground fault detector block, and a capacitance meter block.

12. The method of claim 10, wherein the step of connecting the signal line of the protocol bus to the one of the plurality of measurement blocks includes the step of connecting the signal line to the one of the plurality of measurement blocks in response to a signal from the wiring fault diagnostic manager.

13. The method of claim 10, wherein the step of measuring the electrical characteristic associated with the protocol bus using the one of the plurality of measurement blocks includes the step of disconnecting the signal line of the protocol bus from a communication circuit.

14. The method of claim 10, wherein the step of measuring the electrical characteristic associated with the protocol bus includes the step of measuring one of a resistance, a capacitance, a signal amplitude, a noise level and a power supply voltage.

15. The method of claim 10, wherein the step of determining the type of the wiring fault based on the measured electrical characteristic includes the step of comparing the measured electrical characteristic to a predetermined value associated with the wiring fault.

16. The method of claim 15, wherein the step of comparing the measured electrical characteristic to the predetermined value includes the step of using a predetermined value associated with one of a short circuit, an open circuit, a ground fault, an improper termination, an insufficient signal strength, a poor quality ground connection and an improper supply voltage.

17. The method of claim 10, wherein the step of automatically reporting the type of the wiring fault to the user interface includes the step of sending wiring fault information to the user interface via a controller.

18. A system for detecting a wiring fault for use within a process control system having a user interface, a controller, a protocol bus, a processor, and a linking device that enables a controller to communicate with the plurality of smart field devices, the linking device having a wiring fault detection unit and a wiring fault diagnostic manager therein, the wiring fault detection unit including a plurality of measurement blocks and a signal switching unit, the system comprising:

a computer readable medium;

a first routine stored on the computer readable medium and adapted to be executed by the processor that causes the wiring fault detection unit to connect a signal line of the protocol bus to one of the plurality of measurement blocks;

a second routine stored on the computer readable medium and adapted to be executed by the processor that causes the wiring fault detection unit to measure an electrical characteristic associated with the protocol bus using the one of the plurality of measurement blocks while the protocol bus is substantially active;

a third routine stored on the computer readable medium and adapted to be executed by the processor that determines a type of the wiring fault based on the measured electrical characteristic;

a fourth routine stored on the computer readable medium and adapted to be executed by the processor that automatically reports the type of the wiring fault to the user interface; and a fifth routine stored on the computer readable medium and adapted to be executed by the process that automatically detects a communications problem associated with the protocol bus while the protocol bus is substantially active.

19. The system of claim 18, wherein the second routine is further adapted to cause the wiring fault detection unit to disconnect the signal line of the protocol bus from a communication circuit.

20. The system of claim 18, wherein the second routine is further adapted to measure one of a resistance, a capacitance, a signal amplitude, a noise level and a power supply voltage.

21. The system of claim 18, wherein the third routine is further adapted to compare the measured electrical characteristic to a predetermined value associated with the wiring fault.

22. The system of claim 21, wherein the third routine is further adapted to use a predetermined value associated with one of a short circuit, an open circuit, a ground fault, an improper termination, an insufficient signal strength, a poor quality ground connection and an improper supply voltage.

23. A system that detects a wiring fault for use within a process control system having a controller and a protocol bus, the system comprising:

a plurality of measurement blocks communicatively coupled to the controller and adapted to be coupled to the protocol bus, wherein the controller is programmed to connect one of the plurality of measurement blocks to the protocol bus to detect the wiring fault and wherein the measurement blocks reside within a linking device, wherein the linking device enables the controller to communicate with a plurality of smart field devices, the linking device being operable to automatically detect a communications problem associated with the protocol bus while the protocol bus is substantially active.

24. The system of claim 23, wherein the plurality of measurement blocks includes one of an ohmmeter block, a voltmeter block, a signal generator block, a noise meter block, a ground fault detector block, and a capacitance meter block.

25. The system of claim 23, wherein the wiring fault is one of a short circuit, an open circuit, a ground fault, an improper termination, an insufficient signal strength, a poor quality ground connection and an improper supply voltage.

26. The system of claim 1, wherein the automatic detection of the communications problem occurs during an asynchronous communication interval.

27. The method of claim 10, wherein automatically detecting the communications problem associated with the protocol bus occurs during an asynchronous communication interval.

28. The system of claim 18, wherein the fifth routine automatically detects a communications problem associated with the protocol bus during an asynchronous communication interval.

* * * * *

UNITED STATES PATENT AND TRADEMARK OFFICE
CERTIFICATE OF CORRECTION

PATENT NO. : 6,912,671 B2
DATED : June 28, 2005
INVENTOR(S) : Daniel D. Christensen et al.

It is certified that error appears in the above-identified patent and that said Letters Patent is hereby corrected as shown below:

<u>Title page,</u>
Item [73], Assignee, delete "Bisher" and insert -- Fisher --.
Item [56], References Cited, U.S. PATENT DOCUMENTS, insert the following:
-- 5,066,919    11-1991    Klassen et al.
   6,230,109    05-2001    Miskimins et al.
   6,046,594    04-2000    Mavretic, Anton
   5,848,238    12-1998    Shimomura et al.
   4,792,950    12-1988    Volk et al.
   5,168,237    12-1992    Fieau et al.
   5,539,306    07-1996    Riggio, Jr. Salvatore R.
   3,701,848    10-1972    Joseph W. Dehn
   5,521,903    05-1996    English et al.
   6,037,779    03-2000    Deweerdt et al. --.

<u>Column 12,</u>
Line 7, delete "maybe" and insert -- may be --.

Signed and Sealed this

Thirtieth Day of May, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,912,671 B2 | Page 1 of 1 |
| APPLICATION NO. | : 09/850300 | |
| DATED | : June 28, 2005 | |
| INVENTOR(S) | : Daniel D. Christensen et al. | |

It is certified that error appears in the above-identified patent and that said Letters Patent is hereby corrected as shown below:

In the Claims:

At Column 15, lines 52-53, "a wiring fault detection unit and a wiring fault detection unit" should be -- a wiring fault detection unit and a diagnostic manager --.

At Column 16, lines 35-36, "a wiring fault detection unit and a wiring fault detection unit" should be -- a wiring fault detection unit and a diagnostic manager --.

Signed and Sealed this

Twenty-third Day of September, 2008

JON W. DUDAS
*Director of the United States Patent and Trademark Office*